United States Patent [19]

Marketz

[11] 3,915,971

[45] Oct. 28, 1975

[54] PROCESS FOR THE PRODUCTION OF DISUBSTITUTED MALONIC ACID DINITRILE

[75] Inventor: Herbert Marketz, Visp, Switzerland

[73] Assignee: Lonza, Ltd., Gampel, Valais, Switzerland

[22] Filed: June 6, 1973

[21] Appl. No.: 367,493

[30] Foreign Application Priority Data

June 9, 1972 Switzerland ........................ 8576/72

[52] U.S. Cl. ..... 260/248 R; 260/465 H; 260/465 F; 260/465.8 R; 260/465.6; 260/256.4 N; 260/250 A; 260/294.9; 260/250 BN; 260/243 R; 260/315; 260/309; 260/256.4 C; 260/248 AS; 260/248 CS

[51] Int. Cl.[2] ........... C07D 251/16; C07D 253/04; C07D 253/06; C07C 121/50

[58] Field of Search ..... 260/248 R, 465 H, 465.8 R, 260/465.6, 465 F, 256.4 N, 250 A, 294.9, 250 BN, 243 R, 315, 309, 256.4 C, 248 AS, 248 CS

[56] References Cited

UNITED STATES PATENTS 3,396,209 8/1968 Sekmakas et al. .............. 260/248 X

*Primary Examiner*—John M. Ford
*Attorney, Agent, or Firm*—Christen & Sabol

[57] ABSTRACT

A process for the production of disubstituted malonic acid dinitrile having the formula:

$$R_2C(CN)_2$$

wherein R is an alkyl group, aryl group, aralkyl group, alkaryl group, heterocyclic group, a substituted alkyl group, a substituted aryl group, a substituted alkaryl group, a substituted aralkyl group, or a substituted heterocyclic group, which comprises reacting malonic acid dinitrile with a halide having the formula:

$$RX$$

wherein R is the same as defined above and X is a halogen atom, in the presence of calcium carbide, said reaction being conducted in an organic solvent.

18 Claims, No Drawings

PROCESS FOR THE PRODUCTION OF DISUBSTITUTED MALONIC ACID DINITRILE

BACKGROUND OF THIS INVENTION

1. Field of this Invention

This invention relates to a process for the production of disubstituted malonic acid dinitrile having the formula $R_2C(CN)_2$, wherein R is an alkyl group, aryl group, aralkyl group or alkaryl group, by conversion of malonic acid dinitrile using an alkyl, aryl, aralkyl or alkaryl halide.

2. Prior Art

Primary and secondary mononitriles are alkylated by heating with an alkyl halide in the presence of finely divided sodium amide:

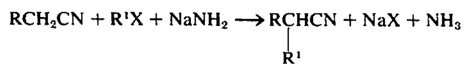

$$RCH_2CN + R^1X + NaNH_2 \longrightarrow RCH(R^1)CN + NaX + NH_3$$

It is also known that disubstituted malonic acid dinitrile can be produced by the conversion of malonic nitrile with lower alkyl halides or benzyl halides in the presence of various bases, such as, $NaNH_2$, sodium alcoholate and NaH. However, the yields resulting from these methods lie between 30 and about 70%. Besides the disadvantage of relatively low yields, all of these processes have the disadvantage that expensive and costly bases must be used (as a result of which the technical realization or commercial feasibility thereof is questionable).

BROAD DESCRIPTION OF THIS INVENTION

An objective of this invention is the production of disubstituted malonic acid dinitrile in high yields and having high purities.

This objective can be achieved according to this invention by conducting the conversion in the presence of calcium carbide and in an organic solvent.

This invention involves a process for the production of disubstituted malonic acid dinitrile having the formula:

$$R_2C(CN)_2$$

wherein R is an alkyl group, aryl group, aralkyl group, alkaryl group, heterocyclic group, a substituted alkyl group, a substituted aryl group, a substituted alkaryl group, a substituted aralkyl group, or a substituted heterocyclic group. The process includes malonic acid dinitrile with a halide having the formula:

$$RX$$

wherein R is the same as defined above and X is a halogen atom, in the presence of calcium carbide, said reaction being conducted in an organic solvent.

The process reaction is preferably conducted at a temperature between 40° and 100°C. Preferably between 1 and 3 moles of calcium carbide are present per mole of malonic acid dinitrile, and more preferably between 1 and 2 moles of calcium carbide are present per mole of malonic acid dinitrile. Preferably X is chlorine, bromine or iodine. Preferably the halide compound is used in an amount which is in excess of the stoichiometric quantity needed for the conversion of the malonic acid dinitrile, and more preferably the halide compound is used in an amount of 5 to 50 percent in excess of the stoichiometric quantity needed for the conversion of the malonic acid dinitrile. Preferably potassium bromide, sodium iodide, potassium iodide or sodium bromide is present during the reaction in a catalytic quantity between about 1 and 10 percent based on the malonic acid dinitrile. Preferably the solvent is a dipolar aprotic solvent which has a high dielectric constant, and more preferably the solvent is dimethyl sulfoxide.

This invention also involves a disubstituted malonic acid dinitrile having the formula:

$$R_2C(CN)_2$$

wherein R is an alkyl group having 5 to 20 carbon atoms, substituted alkyl group, aryl group, substituted aryl group, alkaryl group, substituted alkaryl group, substituted aralkyl group, heterocyclic group, substituted heterocyclic group, aralkyl group containing an alkyl group having 2 to 20 carbon atoms, heterocyclic-alkyl group or substituted heterocycli-alkyl group.

Usually purities of 99 percent or more are obtained, and usually yields of at least 78 percent are obtained.

The disubstituted malonic acid dinitriles, which are produced according to the process of this invention, after hydrogenation into the diamines and conversion into the quaternary salts by known methods, are useful as bactericidal substances.

DETAILED DESCRIPTION OF THIS INVENTION

The reaction is preferably conducted at a temperature between 40° and 100°C.

Preferably 1 to 3 moles of calcium carbide, and more preferably 1 to 2 moles of calcium carbide, are used per mole of malonic acid dinitrile. An industrial grade or quality of calcium carbide (e.g., one having a calcium carbide content of about 80 percent) can be used, which illustrates one advantage of this problem.

Preferably the conversion is carried out in the presence of catalytic quantities of potassium iodide, sodium iodide, potassium bromide or sodium iodide. These catalytic quantities lie between about 1 to 10 percent, related to the amount of malonic acid dinitrile present.

Preferably the halogen atom in the halide reactant is chlorine, bromine or iodine. Examples of useful halides are methyl iodide, butyl bromide, iospropyl bromide, pentyl chloride, octyl chloride, decyl chloride, lauryl chloride and benzyl chloride. Preferably the halide compound is used in an amount which is in a small excess of the stoichiometric quantity needed for the conversion of the malonic acid dinitrile. The small excess is most preferable an amount of 5 to 50 percent shown the stoichiometric amount.

R, when an alkyl group, preferably has 1 to 20 carbon atoms. Examples of such are methyl, ethyl, n-propyl, isopropyl, n-butyl, isobutyl, sec-butyl, tert-butyl, 1-pentyl, 2-methyl-1-butyl, isoamyl, neopentyl, 2-pentyl, 3-pentyl, 3-methyl-2-butyl, n-hexyl, 2-methyl-2-butyl, isohexyl, 2-methyl-1-pentyl, 2-ethyl-1-butyl, 3-methyl-1-pentyl, 2-hexyl, 1-pentadecyl, 3,3-dimethyl-1-butyl, 3-hexyl, 2-hexacyl, 2,3-dimethyl-1-butyl, 4-methyl-2-pentyl, n-heptyl, 2-methyl-3-pentyl, 4-methyl-1-hexyl, 2-methyl-2-pentyl, 2,3,3-trimethyl-2-butyl, 2,3-dimethyl-2-butyl, 1-octyl, 2,4-dimethyl-3-pentyl, 2-octyl, 2,4-dimethyl-1-pentyl, 3-methyl-2-isopropyl-2-butyl, 2-ethyl-1-hexyl, lauryl (or 1-dodecyl), 2,4,4-trimethly-1-pentyl, 1-nonyl, 2,3,4-trimethyl-1-pentyl, 1-tridecyl, 3,3,4-trimethyl-1-pentyl, 1-tetradecyl, 2,3,4-trimethyl-2-pentyl, 1-undecyl, 1-decyl, 1-heptadecyl, 1-octadecyl, 1-nonadecyl and 1-eicosyl. Such alkyl groups can be substituted by hydroxyl and examples of such substituted alkyl groups are $HOCH_2$—, 2-hydroxyl-1-propyl, $CH_3CHOHCHOHC_2H_4$— and $HOC_2H_4$—.

R, when an aryl group, preferably has 6 to 18 carbon atoms. Examples of such are phenyl, naphthyl, anthracyl, phenanthryl and benzonaphthyl. Such aryl groups can be substituted by at least one hydroxyl, and examples of such substituted aryl groups are 2-hydroxy-phenyl, 2,4-dihydroxy phenyl, 3-hydroxy-phenyl, 6-hydroxy-1-naphthyl, and 3-hydroxy-2-naphthyl.

R, when an aralkyl group, preferably contains on alkyl groupp having 1 to 20 carbon atoms and contains at least one aryl group having 6 to 18 carbon atoms. Examples of such are benzyl, phenyl ethyl, $C_6H_5C_4H_8$—, $C_6H_5C_3H_6$—, $C_6H_5C_5H_{10}$—, $C_6H_5C_8H_{16}$—,

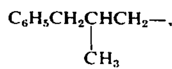

$C_6H_5C_{12}H_{24}$—, $C_6H_5C_{10}H_{20}$—,

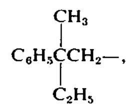

and

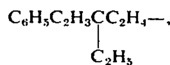

naphthyl-ethyl, anthryl-methyl and naphthyl-octyl. Such aralkyl groups can be substituted by hydroxyl or alkyl (having 1 to 20 carbon atoms) and examples of such substituted aralkyl groups are hydroxyl-naphthyl-ethyl, ethyl-phenyl-ethyl, methyl-naphthyl-ethyl, $HOC_6H_5C_{12}H_{24}$—, $CH_3C_6H_5C_2H_4$— and

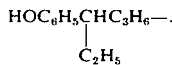

R, when an alkaryl group, preferably contains an aryl group having 6 to 18 carbon atoms and contains at least one alkyl group having 1 to 20 carbon atoms. Examples of such are methyl phenyl, propyl phenyl, dimethyl phenyl, octyl phenyl, propyl naphthyl, decyl phenyl, octyl naphthyl, diethyl phenyl, decyl phenanthryl, propyl anthryl, and methyl benzonaphthyl. Such alkaryl groups can be substituted by at least one hydroxyl group, and examples of such are 2-methyl-3-hydroxy-phenyl and 3-octyl-2,4-dihydroxylphenyl.

R can be a 5 or 6 member heterocyclic ring or combinations of two or three such rings. R can be such rings which contain C and/or N and/or O and/or S. Examples of such are pyrimidyl, pyridazyl, pyridyl, pyrazyl, s-triazyl as-triazyl, v-triazyl, 1,2,5-oxathiazyl, naphthyridyl carbazoyl, 2-isoimidazoyl, prryl, acridyl and 1,3,2-benzoxazyl. Such heterocyclic rings can be substituted by hydroxyl, and examples of such substituted hydroxyl rings are 6-hydroxyl-3-acridyl, 4,5-dihydroxyl-2-pyrimidyl, and 3-hydroxyl-5-indoxazyl.

R can be a heterocyclic-alkyl; the heterocyclic portion can be a 5 or 6 member ring, or combinations of two or three such rings; the heterocyclic ring(s) can contain C and/or N and/or O and/or S; the alkyl group can contain 1 to 20 atoms. Examples of such are pyridyl-ethyl, acridyl-octyl, naphthyridyl-methyl and pyrimidyl-ethyl. Such heterocyclic-alkyls can be substituted by at least one alkyl group having 1 to 20 carbon atoms and/or at least one hydroxyl group. Examples of such are octyl-pyridyl-ethyl, methyl-pyrimidyl-ethyl, dihydroxyl-pyrimidyl-ethyl, methyl-acridyl-methyl, and hydroxyl-acridyl-propyl.

Any organic solvent can be used which does not react with any of the reactants or materials present in the reaction formulation. Preferably dipolar aprotic solvent having a high dielectric constant is used, and the most preferred solvent is dimethyl sulfoxide.

Preferably the dielectric constant of the aprotic solvent having a high dielectric constant lies between 20 and 50.

Examples of useful dipolar aprotic solvents are dimethyl sulfoxide (preferred), dimethyl formamide, diethyl sulfoxide, dimethylacetamide, ethylenglycoldialkylether, formamide, methyl propionamide, sulfolane, N-methyl formamide, dimethyl sulfone, tetramethylsulfone, hexamethyl phosphoric acid triamide and mixtures of these solvents.

The useful solvents must be capable of dissolving the reactants, without reacting with them.

Aprotic solvents are defined in Monograph 105 of the National Bureau of Standards. Aprotic solvents are almost devoid of acidic or basic properties, for example, aprotic solvents do not interact strongly with acidic solutes, such as, carboxylic acids, phenols, and mineral acids, or with basic solutes such as, amines and derivatives of guanidine or pyridine. They are comparatively inert in character. Indifferent solvents or inert solvents are other names for aprotic solvents. In general, aprotic solvents are organic compounds which contain elements other than carbon and hydrogen.

The quantity of solvent used is not critical, but preferably about 600 grams of solvent are used per mole of malonic acid dinitrile.

All percentages, parts and ratios used herein are on a weight basis, unless otherwise stated or obvious to one ordinarily skilled in the art.

EXAMPLE 1

0.5 moles of malonic acid dinitrile was dissolved in 50 gm. of dimethyl sulfoxide, and that admixture was added at 50°C. drop-by-drop slowly to a suspension of 1 mole of $CaC_2$ (80 percent purity) in 250 gm. of dimethyl sulfoxide. After completion of the reaction, the temperature was kept constant at 50°C. for about 15 minutes. Subsequently, the reaction admixture was treated with a catalytic quantity of potassium iodide and 1.2 mole of decyl chloride. The reaction was completed at a temperature of 80°C. after 50 hours. The reaction admixture was filtered, while still hot, and the two resultant liquid phases were separated. After two extractions of the dimethyl sulfoxide phase with decyl chloride, the combined extract were distilled. The distillation residue was recrystallized from methanol. 152 gm. of didecyl malonic acid dinitrile were obtained. The product had a purity of 99.2 percent and a melting point of 43°C. The yield, related to the amount of malonic acid dinitrile used, was 90 percent of theoretical.

EXAMPLE 2

Using the method of Example 1, octyl chloride was reacted with malonic acid dinitrile. After 48 hours of reaction time, the conversion of malonic acid dinitrile into dioctyl malonic nitrile amounted to 95 percent. After the recrystallization of the distillation residue from methanol, 87 to 88 percent of the dioctyl malonic nitrile was isolated. The product had a purity of 99 percent and a melting point of 33.5°C.

EXAMPLE 3

Malonic acid dinitrile was alkylized with lauryl chloride using conditions and method described in Example 1. A yield of 90 to 91 percent, in relation to the dilauryl malonic acid dinitrile, was obtained. The product had a melting point of 55.5° to 56°C. and a purity of 99.9 percent.

EXAMPLE 4

The production of dicetyl malonic nitrile was carried out using cetyl chloride according to the method of Example 1. The processing, because of the low solubility of dicetyl malonic acid dinitrile, had to be changed so that ethanol was used for the recrystallization. The yield was 78 percent. The product had a purity of 99.9 percent and a melting point of 63.5°C.

EXAMPLE 5

For the production of dibenzyl malonic nitrile, first one mole of malonic acid dinitrile was treated with calcium carbide, as described in Example 1. After that, the reaction mixture was cooled down to 25°C. and 1.2 moles of benzyl chloride was added within 40 minutes. As a result of a strongly exothermal reaction, the temperature increased to 60°C. At this temperature, the mixture was stirred for 3 hours. Subsequently the reaction mixture was cooled to 0°C., was adjusted to pH5 using diluted hydrochloric acid, and was extracted with ether. After drying and concentrating of the volative solution, the residue was recrystallized from ethanol. 113.4 gm. of dibenzyl malonic acid dinitrile was obtained. The product had a purity of 99.9 percent and a melting point of 130.5°C. The yield was 92 percent of theoretical, based on the starting malonic acid dinitrile.

EXAMPLE 6

Using the method of Example 5, 1 mole of malonic acid dinitrile was converted with 1.2 moles of butyl bromide. The residue, after concentrating of the volatile solution, was liquid and was distilled under vacuum. 82.4 gm. of dibutyl malonic nitrile was obtained. The product had a purity of 99.8 percent and a boiling point of 123°C. (at 12.1 toor). The yield was 95.3 percent of theoretical, based on the starting malonic acid dinitrile.

EXAMPLE 7

Malonic acid dinitrile was converted, using the method of Example 5 with 2-isoprophyl-6-chloromethyl-4-pyrimidinol. The reaction time was 4 hours at 50°C. Yield: 80.3% of the yield of di-(4-hydroxyl-2-isopropyl-6-pyrimidyl methyl)-malonic nitrile was 80.3 percent of theoretical. The product had a purity of 99.5 percent and a melting point of 280°to 285°C. (decomposition).

EXAMPLES 8 AND 9

Example 1 was repeated twice except that a reaction temperature of 60° and 95°C., respectively, was used. A product was obtained in high yield and it had a very high purity.

EXAMPLE 10

Example 1 was repeated except that the starting $CaC_2$ had a purity of 95 percent. A product was obtained in high yield and it had a very high purity.

EXAMPLE 11

Example 1 was repeated except that the potassium iodide was not used.

What is claimed is:

1. A process for the production of disubstituted malonic acid dinitrile having the formula:

$$R_2C(CN)_2$$

wherein R is a member selected from the group consiting of an alkyl group having 1 to 20 carbon atoms, $HOCH_2$—, 2-hydroxyl-1-propyl, $CH_3CHOHCHOHC_2H_4$—, $HOC_2H_4$—, phenyl, naphthyl, anthracyl, phenanthryl, benzonaphthyl, 2-hydroxy-phenyl, 2,4-dihydroxy-phenyl, 3-hydroxy-phenyl, 6-hydroxy-1-naphthyl, 3-hydroxy-2-naphthyl, benzyl, phenyl, ethyl, $C_6H_5C_4H_8$—, $C_6H_5C_3H_6$—, $C_6H_5C_5H_{10}$—, $C_6H_5C_8H_{16}$—,

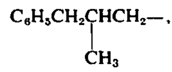

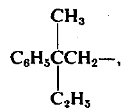

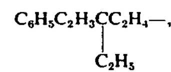

naphthyl-ethyl, anthryl-methyl, naphthyl-octyl, $C_6H_5C_{12}H_{24}$—, $C_6H_5C_{10}H_{20}$—, hydroxyl-naphthyl-ethyl, ethyl-phenyl-ethyl, methyl-naphthyl-ethyl, $HOC_6H_5C_{12}H_{24}$—, $CH_3C_6H_5C_2H_4$—,

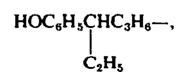

methyl phenyl, propyl phenyl, dimethyl phenyl, octyl phenyl, propyl naphthyl, decyl phenyl, octyl naphthyl, diethyl phenyl, decyl phenanthryl, propyl anthryl, methyl benzonaphthyl, 2-methyl-3-hydroxyl-phenyl, 3-octyl-2,4-dihydroxy-phenyl, pyrimidyl, pyridazyl, pyridyl, pyrazyl, s-triazyl, as-triazyl, v-triazyl, 1,2,5-oxathiazyl, naphthyridyl carbazoyl, 2-isoimidazoyl, acridyl, 6-hydroxyl-3-acridyl, 4,5-dihydroxyl-2-pyrimidyl, pyridyl-ethyl, acridyl-octyl, naphthyridyl-methyl and pyrimidyl-ethyl, which comprises reacting malonic acid dinitrile with a halide having the formula:

$$RX$$

wherein R is the same as defined above and X is a halogen atom, in the presence of calcium carbide, said reaction being conducted in an organic solvent.

2. A process as described in claim 1 wherein the reaction is conducted at a temperature between 40° and 100°C.

3. A process as described in claim 1 wherein between 1 and 3 moles of calcium carbide are present per mole of malonic acid dinitrile.

4. A process as described in claim 3 wherein between 1 and 2 moles of calcium carbide are present per mole of malonic acid dinitrile.

5. A process as described in claim 1 wherein X is chlorine, bromine or iodine.

6. A process as described in claim 1 wherein said halide compound is used in an amount which is in excess of the stoichiometric quantity needed for the conversion of the malonic acid dinitrile.

7. A process as described in claim 6 wherein said halide compound is used in an amount of 5 to 50 percent in excess of the stoichiometric quantity needed for the conversion of the malonic acid dinitrile.

8. A process as described in claim 1 wherein potassium bromide, sodium iodide, potassium iodide or sodium bromide is present during the reaction in a catalytic quantity between about 1 and 10 percent based on the malonic acid dinitrile.

9. A process as described in claim 1 wherein said solvent is a dipolar solvent which has a high dielectric constant.

10. A process as described in claim 1 wherein said solvent is dimethyl sulfoxide.

11. A process as described in claim 1 wherein RX is decyl chloride.

12. A process as described in claim 1 wherein RX is octyl chloride.

13. A process as described in claim 1 wherein RX is lauryl chloride.

14. A process as described in claim 1 wherein RX is cetyl chloride.

15. A process as described in claim 1 wherein RX is benzyl chloride.

16. A process as described in claim 1 wherein RX is butyl bromide.

17. A process as described in claim 1 wherein RX is 2-isopropyl-6-chloromethyl-4-pyrimidinol.

18. A process as described in claim 1 wherein RX is an alkyl group having 1 to 20 carbon atoms.

* * * * *